(12) United States Patent
Ravid et al.

(10) Patent No.: US 10,721,148 B2
(45) Date of Patent: Jul. 21, 2020

(54) SYSTEM AND METHOD FOR BOTNET IDENTIFICATION

(71) Applicant: RADWARE, LTD., Tel Aviv (IL)

(72) Inventors: Zeev Ravid, Rehovot (IL); Mor Krispil, Petah-Tikva (IL)

(73) Assignee: RADWARE, LTD., Tel Aviv (IL)

( * ) Notice: Subject to any disclaimer, the term of this patent is extended or adjusted under 35 U.S.C. 154(b) by 0 days.

(21) Appl. No.: 16/160,305

(22) Filed: Oct. 15, 2018

(65) Prior Publication Data

US 2019/0116103 A1 Apr. 18, 2019

Related U.S. Application Data

(60) Provisional application No. 62/572,895, filed on Oct. 16, 2017.

(51) Int. Cl.
| | |
|---|---|
| *H04L 12/26* | (2006.01) |
| *H04L 29/12* | (2006.01) |
| *H04L 29/06* | (2006.01) |
| *H04L 29/08* | (2006.01) |
| *H04L 12/24* | (2006.01) |

(52) U.S. Cl.
CPC .......... *H04L 43/08* (2013.01); *H04L 43/0817* (2013.01); *H04L 43/106* (2013.01); *H04L 61/2007* (2013.01); *H04L 63/14* (2013.01); *H04L 67/18* (2013.01); *H04L 69/16* (2013.01); *H04L 41/147* (2013.01); *H04L 67/12* (2013.01)

(58) Field of Classification Search
CPC ... H04L 43/08; H04L 43/106; H04L 43/0817; H04L 67/18; H04L 63/14; H04L 61/2007; H04L 69/16; H04L 41/147; H04L 67/12; H04L 2463/144; H04L 63/1425
USPC .................................................. 709/223, 224
See application file for complete search history.

(56) References Cited

U.S. PATENT DOCUMENTS

| | | | |
|---|---|---|---|
| 9,773,112 B1* | 9/2017 | Rathor | G06F 21/56 |
| 9,930,065 B2* | 3/2018 | Nelms | H04L 63/145 |
| 2010/0138377 A1* | 6/2010 | Wright | G06K 9/6284 706/52 |
| 2017/0251016 A1* | 8/2017 | Niv | H04L 43/08 |
| 2018/0145978 A1* | 5/2018 | Kim | H04L 41/0853 |
| 2018/0246552 A1* | 8/2018 | Thompson | G06F 11/3058 |

* cited by examiner

*Primary Examiner* — Michael Won
(74) *Attorney, Agent, or Firm* — M&B IP Analysts, LLC

(57) ABSTRACT

A system and method for identifying botnets. The method includes determining a network event proximity based on collected network data, where the network data relates to at least one network device; determining time density of the network data; determining trend patterns of the network data; and determining, based on the network event proximity, time density, and trend patterns, when a botnet activity is present within the network data.

16 Claims, 4 Drawing Sheets

SYSTEM AND METHOD FOR BOTNET IDENTIFICATION

CROSS-REFERENCE TO RELATED APPLICATIONS

This application claims the benefit of U.S. Provisional Application No. 62/572,895 filed on Oct. 16, 2017, the contents of which are hereby incorporated by reference.

TECHNICAL FIELD

The present disclosure relates generally to botnets, and more specifically to the identification of botnets over a network.

BACKGROUND

The challenge of ensuring security and privacy for devices connected over the Internet has become increasingly difficult, while at the same time, becoming ever more important, as more private and sensitive information is being stored and accessed online. Cyber threats to the data of individuals, corporations, and governments are constantly evolving and becoming more complex. One prevalent threat currently being deployed is the execution of malicious code, or malware, which can include viruses, ransomware, rootkits, and the like.

Among the tools used to propagate such malware are malware bots. Bots are any computing device that can be used to execute a piece of code, and are often used without the knowledge of the executing device's owner. Multiple bots can be connected together to form a bot network, or a botnet, that can be controlled by a single entity. These botnets can be connected and controlled over the Internet remotely and programmed to execute simple or complex tasks. Recently, botnets have used the increased popularity of Internet of Things (IoT) devices, where traditionally non-Internet connected appliances and devices, such as microwaves, audio speakers, home security cameras, and the like, are updated to allow connection to a home network and the Internet to allow for remote control and access. These devices are often sold with default credentials that many owners fail to change, allowing malicious entities easy access to these devices to increase the size of their botnets.

While some botnets may be used for constructive goals, many are employed for more nefarious purposes. These malicious botnets can be spread over many devices and programmed to execute harmful code when invoked. Some botnets extend over thousand or tens of thousands of devices that have been unwittingly recruited for the execution of the malicious code.

One common use of malicious botnets includes distributed denial of service (DDoS) attacks, which command multiple devices from a botnet to flood a target, such as a server or a website, with a stream of requests, messages, or malformed packets, inundating the target and causing a massive spike and overflow of bandwidth. This can effectively shut down a target server or website, causing financial harm as well as preventing legitimate users from successfully accessing the target.

Further uses of botnets include generating fake internet traffic, e.g., to unfairly monetize advertising based on the falsely generated traffic, and leveraging botnets to send massive amounts of spam email from various locations. While a single Internet Protocol (IP) address can be easily blocked by an internet service provider, thousands of IP addresses, constantly shifting, are much more difficult to control. Further, botnets exploit IoT devices typically installed at homes and are configured with dynamic IP addresses which constantly are changed and updated. Thus, it is difficult to track and block attacks initiated by such botnets. In addition to using the bandwidth offered by the multitude of devices controlled by a botnet, the processing power that can be harnessed from the array of devices in a botnet is unachievable through a single machine. Thus, botnets can be used by an attacker to execute more complex and intensive tasks on one or more victims.

Spammers will often hire the services of a malware entity and effectively rent out the botnet system for malicious use without having to maintain the system themselves, thus allowing a single botnet to be leveraged by many bad actors for a variety of attacks. However, because of the distributed nature of a botnet, not only can it be difficult to block botnet attacks, it can be equally challenging to track down those who control the botnets.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for identifying botnets, including determining a network event proximity based on collected network data, where the network data relates to at least one network device; determining time density of the network data; determining trend patterns of the network data; and determining, based on the network event proximity, time density, and trend patterns, when a botnet activity is present within the network data.

Certain embodiments disclosed herein also include a non-transitory computer readable medium having stored thereon instructions for causing a processing circuitry to perform a process, the process including: determining a network event proximity based on collected network data, where the network data relates to at least one network device; determining time density of the network data; determining trend patterns of the network data; and determining, based on the network event proximity, time density, and trend patterns, when a botnet activity is present within the network data.

Certain embodiments disclosed herein also include a system for identifying botnets, including: a processing circuitry and a memory; the memory containing instructions that, when executed by the processing circuitry, configure the system to: determine a network event proximity based on collected network data, where the network data relates to at least one network device; determine time density of the network data; determine trend patterns of the network data;

and determine, based on the network event proximity, time density, and trend patterns, when a botnet activity is present within the network data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
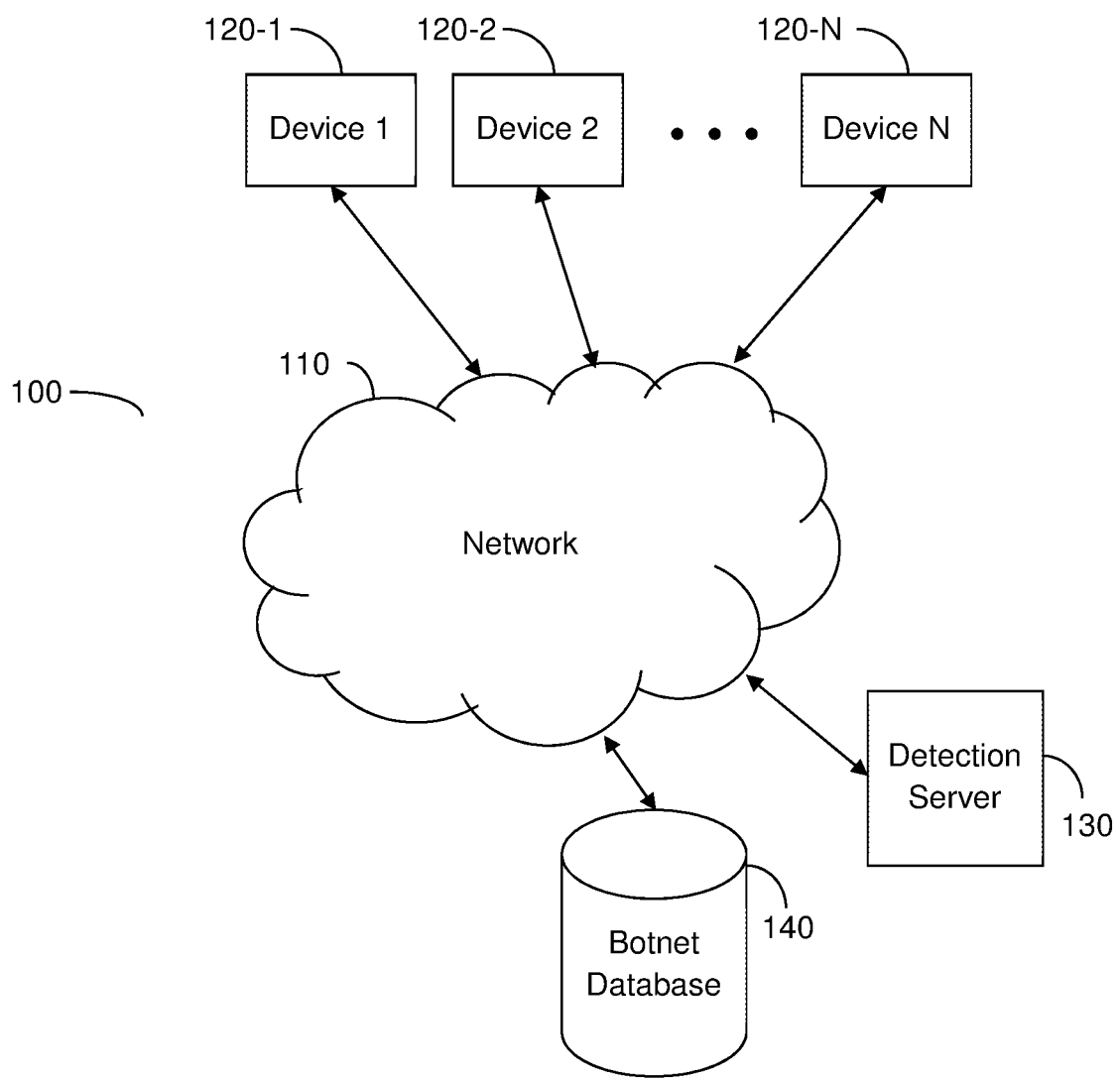
FIG. 1 is a network diagram of a system for detecting botnets, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example network diagram 100 utilized to describe the various embodiments for detecting botnets. The system includes a detection server 130 and a plurality of devices 120-1 through 120-N (where N is an integer equal to or greater than 1, hereinafter referred to individually as a device 120 and collectively as devices 120 or botnet devices 120, merely for simplicity purposes) that are communicatively connected via a network 110. The network 110 may be, but is not limited to, a local area network (LAN), a wide area network (WAN), a metro area network (MAN), the Internet, a wireless, cellular or wired network, and the like, and any combination thereof.

The devices 120 are network-connected computing devices that may be accessed and employed as part of a botnet. These devices may include a variety of consumer electronics, such as smartphones and personal computers, as well as home appliances with network connectivity, such as IoT devices. IoT devices contain a network interface (not shown) for connection to a network, such as the Internet, as well as a processing circuitry (not shown), which may be leveraged for use in execution of a botnet attack. These device can include network connected microwaves, audio speakers, home security cameras, thermostats, smart locks, smart doorbells, and the like. As many of such devices lack the advanced security features of traditional computing devices like personal computers and smartphones, they are often easier for a malicious entity to compromise. Once accessed, they can be configured for use within a botnet system.

As the tasks executed by a botnet can be sporadic and require minimal resources from each individual device 120, and as a malicious code executed by the botnet may not require complete dedication from the device 120, the owner of a device 120 may not even be aware of its involvement in the botnet as it can simultaneously contribute to the botnet while continuing to operate for its originally indented purpose.

Figure 2:
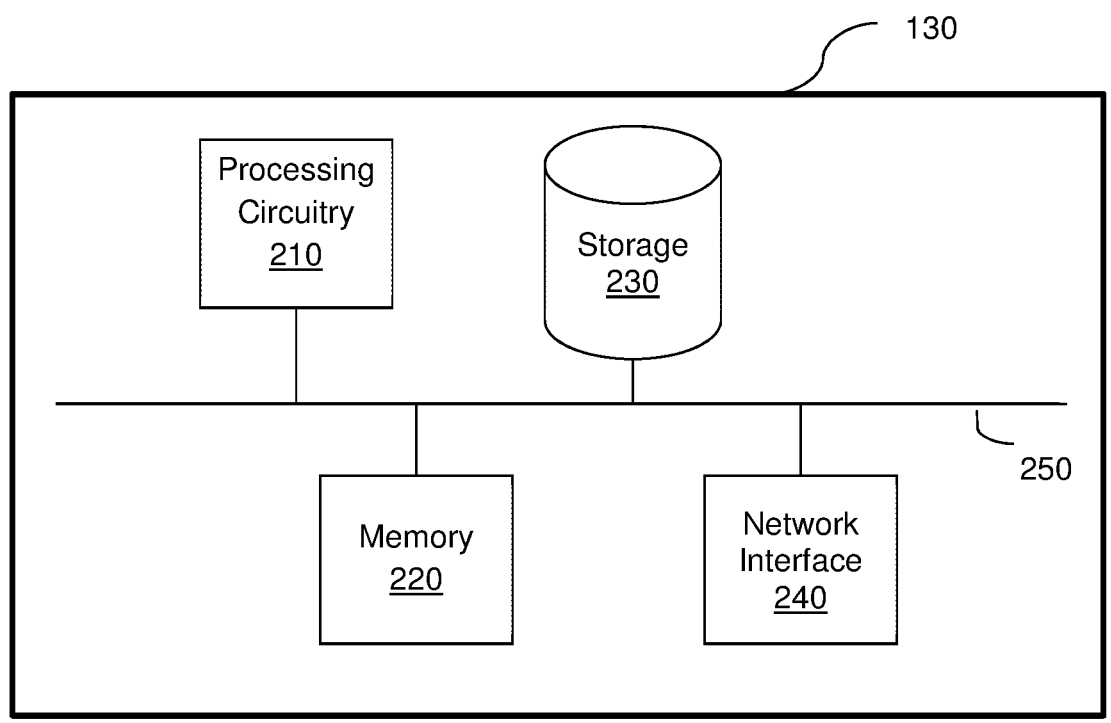
FIG. 2 is a block diagram of a detection server according to an embodiment.

The detection server 130, explained in more detail below in FIG. 2, is configured to perform a process for analyzing network data in order to identify botnet activity. In an embodiment, the detection server 120 may execute various analysis tasks on network data to detect and identify botnet activity. In an embodiment, the analysis includes accessing various databases and other data sources, such as a botnet database 140, which include data related to the behavior of botnet systems. The data may be correlated with firewall or malware data, e.g., internal data from the intended victim based on prior malware attempts.

An example block diagram of the detection server 130 is provided below. It should be noted that the detection server 130 may be installed on-premises or may be hosted in a cloud computing platform.

The databases 140 may be, but are not limited to, data repositories or databases holding a variety of botnet data, such as characteristics of a botnet attack including which ports of a target are accessed, timelines of a botnet attack, suspicious IP addresses, and the like. According to an embodiment, the detection server 130 is configured to send an alert if a botnet has been detected, or if the likelihood of a botnet attack is determined to exceed a predetermined threshold.

FIG. 2 is an example block diagram of the detection server 130 structured according to an embodiment. The detection server 130 includes a processing circuitry 210 connected to a memory 220, a storage 230, and a network interface 240. In an embodiment, the components of the detection server 130 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, and the like. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to analyze network data to determine and identify the presence of a botnet attack.

The storage 230 may be magnetic storage, optical storage, and the like, and may be realized, for example, as flash memory or other memory technology, magnetic hard drive, solid state hard drive, or any other medium which can be used to store the desired information.

The network interface 240 allows the detection server 130 to communicate with the network 110, the databases 140, or a combination thereof, of FIG. 1 for the purpose of, for example, collecting network data for identifying botnet activity.

It should be understood that the embodiments described herein are not limited to the specific architecture illustrated in FIG. 2, and other architectures may be equally used without departing from the scope of the disclosed embodiments.

Figure 3:
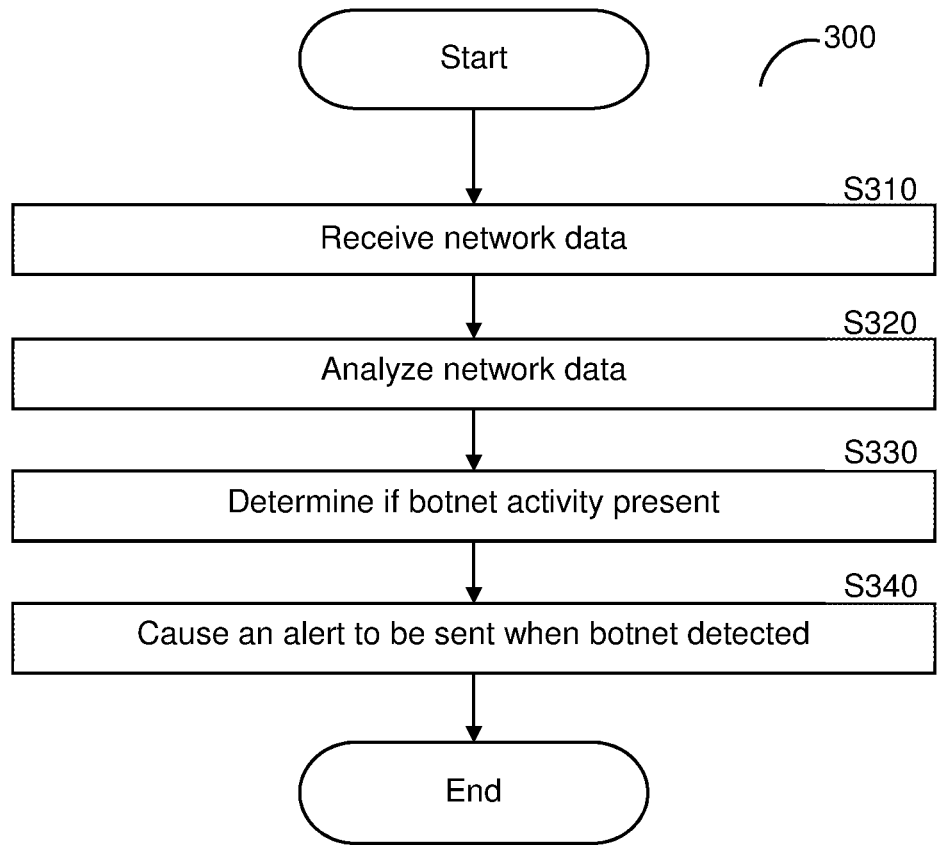
FIG. 3 shows a flowchart illustrating a method of detecting a botnet over a network according to an embodiment.

FIG. 3 shows an example flowchart 300 illustrating the method for detecting a botnet over a network according to an embodiment.

At S310, traffic and traffic attributes (hereinafter "network data") are collected. The traffic and/or the traffic attributes can be intercepted or received from cloud services. In an embodiment, collected network data relates to network events that occur within a specific network. The events include pull requests, code executions, and access or attempted access to specific ports. The collected data may further include the timing of the events, the frequency of the events, the number and density of the events, i.e., how many events per unit of time, Autonomous System Numbers (ASNs), Universal Resource Identifiers (URIs) used in the events, Transmission Control Protocol (TCP) fingerprinting, the geographical origin of requests, the IP addresses and servers from where requests originate, boot patterns of requesting servers and devices, and the like.

At S320, the collected traffic and attributes are analyzed, as described below, and at S330, based on the analysis, a determination is made if botnet activity has been identified. If botnet activity has been identified at S340, a mitigation action be executed. Such a mitigation may include: triggering an alert warning of a potential botnet attack, blocking traffic from the source IP address, updating a botnet DB with the identified IP address, generating a reputation feed of a source IP address, and sending botnet definitions to our cloud services. In a further embodiment, S340 also includes executing defensive actions to mitigate any potential damage caused by the botnet activity.

Figure 4:
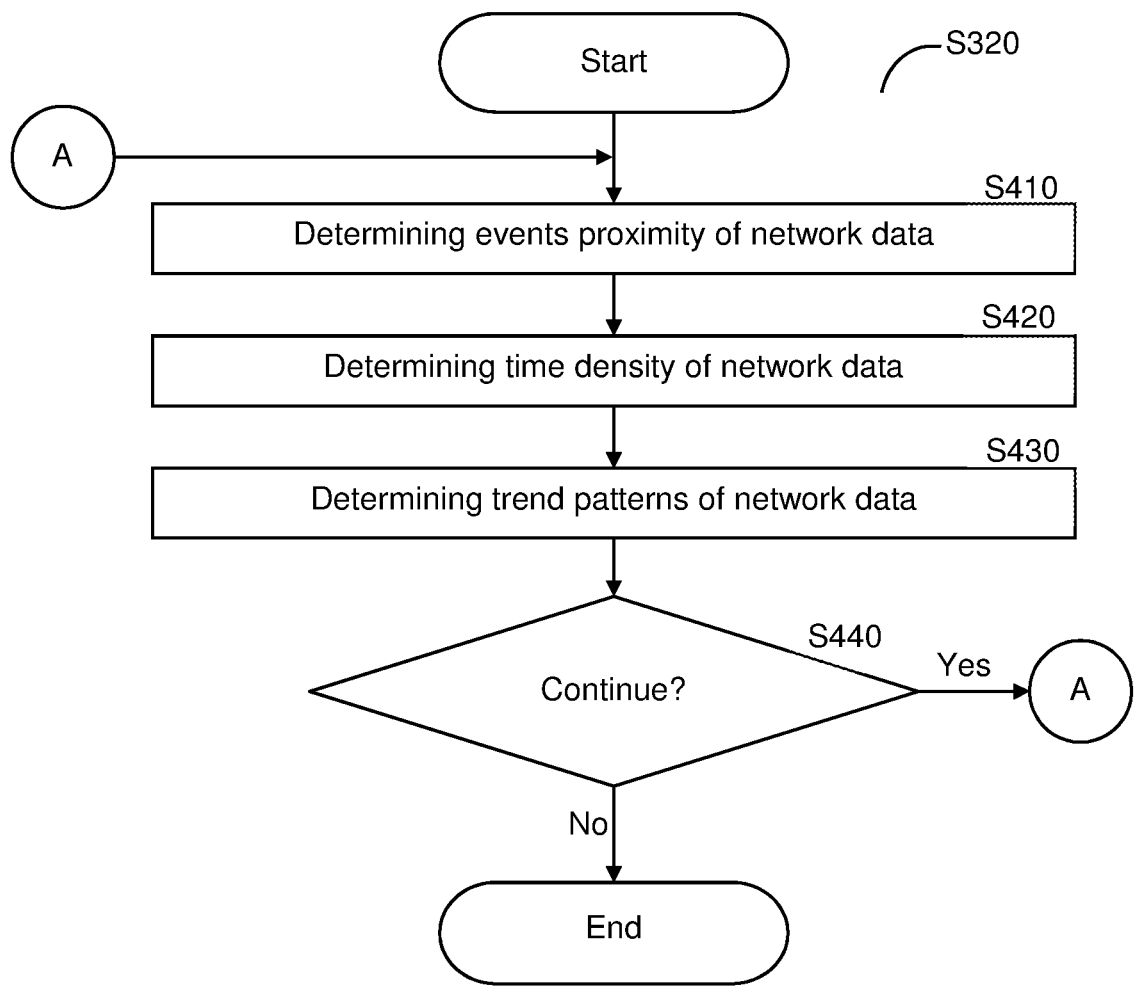
FIG. 4 is a flowchart illustrating a method of analyzing network data according to an embodiment.

FIG. 4 is an example flowchart S320 illustrating the process for analyzing the collected network data according to an embodiment.

At S410, the proximity of network events is determined. Network events occurring in close proximity are often much more likely to originate from the same network device or connected group of devices, such as a botnet. In addition, if multiple detected network devices share a very close boot-time (e.g., each network device has a boot time within a minute of each other), this can indicate: (1) a group of virtual machines (VMs) that were launched together; (2) a data center had been powered-up, both of which may be indicative of a botnet operation; (3) a collection of infected IOT devices that were infected and then restarted at a proximate time by the same operator and script running. It should be noted that the IoT devices can crash and restart from the attack attempts, and this would indicate identical boot time.

These events are analyzed based on network devices acting together. Various tools may be employed to determine relationships of multiple network devices acting in concert, including Transmission Control Protocol (TCP) fingerprinting, which is the analysis of multiple data and metadata associated with a network device to identify various characteristics. For example, if multiple network events originate from a large group of machines, each running the exact same version of an operating system, it may be determined that a single command is being executed by the same virtual machine run on a botnet of multiple network devices. Specific target attributes, such as similar destination ports and URIs, used in a single network event originating from multiple devices may also be analyzed if executed within a predetermined time proximity.

In an embodiment, TCP timestamps are additionally analyzed. The system uptime of network devices within a botnet can be detected by analyzing the TCP timestamps option field per Remote Function Call (RFC) 1323 standards (TCP Extensions for High Performance). This information can be very telling in distinguishing between high-end servers (typically having a high uptime of months or even years) and low-end personal PCs (with a typical low uptime of days).

In addition, such a timestamp would be expected to be consistently increased by the operating system (OS) running the bot along a set time axis, meaning it is expected that the same server with uptime U in time T to have uptime U+d at time T+d minutes. This information can be used to identify whether a bot has rebooted the OS while still maintaining the same IP address, or, on the other hand, if a bot has changed the IP address during a time interval while maintaining a consistent and increasing OS uptime.

By normalizing the uptime field to a fixed boot-time timestamp, new packets arriving from a bot can be analyzed to determine if the bot has been previously identified, e.g., whether it has the same IP address with the same boot time, or a different IP with the same boot time, as another identified source, indicating if it is the same server, for example a dynamic IP asymmetric digital subscriber line (ADSL) subscriber, a system which periodically changes IP addresses for each device even if attached to the same network.

The analysis may further involve the determination of patterns in server reboot schedules, IoT reboot commands, or crashes. Once a bot is identified as generating traffic over extended periods of time (e.g., weeks or months) using the same IP, patterns in server reboots can be determined; for instance, weekly restarts, monthly restarts, reboots on specific days of the week or during specific time windows. These patterns can be analyzed to reveal expected or suspicious network behavior.

If a known botnet, e.g., one that has been previously detected based on certain parameters and has been tracked, disappears and then re-appears with a new (i.e., zeroed out) uptime, the reboot pattern of the botnet over time can be tracked and updated accordingly. Further, a correlation between the boot time and the initial events detected in implemented sensors can be indicative of certain patterns of botnet operator activity, starting up immediately or within a short time span after a bot OS reboot.

At S420, the time density of network data is determined. Time density includes determining the amount of similar network events occurring per time unit. In a graphical representation, this can be indicated by finding a spike of network activity in a short period of time.

At S430, trend patterns of network devices are determined. The trends include multiple network devices sending requests to a single port, using the same URI and ASN, and originating from the same location based on IP address or server routing. The numbers of unique counts of destination ports per IP, unique counts of source ports per IP, and the total set of destination ports can also be used to determine expected or unexpected behavior.

Additionally, the scan rate of the network devices is analyzed. For example, if a complete internet wide scan is expected to take a minimum of 4 minutes, and a detection of a complete scan, e.g., of isolated data within a secure "honeypot," occurs in less than 2 minutes, then it can be ascertained that the scanner is performing a repeated scan rather than an initial scan. Further, the number of events that have interacted with a honeypot can be used as an additional indication parameter.

At S440, it is determined whether to continue the method 100 by reanalyzing the network behavior. If so, the method continues with S110, otherwise it ends.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying botnets, comprising:
   determining a network event proximity based on collected network data, where the network data relates to at least one network device, and wherein determining the network event proximity includes analyzing the network data of the at least one network device based on transmission control protocol (TCP) fingerprinting;
   determining time density of the network data, wherein time density is the amount of network events occurring per time unit;
   determining trend patterns of the network data, wherein determining the trend patterns of the network data includes determining interactions of the at least one network device with a honeypot;
   determining, based on the network event proximity, time density, and trend patterns, when a botnet activity is present within the network data; and
   causing execution of an at least one mitigation action when botnet activity is determined to be present.

2. The method of claim 1, wherein determining the network event proximity includes:
   analyzing boot times of the at least one network device.

3. The method of claim 1, wherein determining the network event proximity includes:
   identifying patterns in server reboot schedules.

4. The method of claim 1, wherein the network event proximity is based on a time proximity and determining the time density of the network data includes:
   determining the amount of similar network events occurring per time unit.

5. The method of claim 1, wherein determining the trend patterns of the network data includes:
   identifying trends of the at least one network device based on at least one of: sending requests to a single port, requests originating from the same location based on Internet Protocol (IP) address or server routing, the numbers of unique counts of destination ports per IP, the unique counts of source ports per IP, and the total set of destination ports.

6. The method of claim 1, wherein determining the trend patterns of the network data includes:
   determining a scan rate of the at least one network device.

7. The method of claim 1, wherein the at least one network device is an Internet of Things (IoT) device.

8. The method of claim 1, wherein the collected data includes traffic and traffic attributes collected from at least external cloud services.

9. A non-transitory computer readable medium having stored thereon instructions for causing a processing circuitry to perform a process, the process comprising:
   determining a network event proximity based on collected network data, where the network data relates to at least one network device, and wherein determining the network event proximity includes analyzing the network data of the at least one network device based on transmission control protocol (TCP) fingerprinting;
   determining time density of the network data, wherein time density is the amount of network events occurring per time unit;
   determining trend patterns of the network data, wherein determining the trend patterns of the network data includes determining interactions of the at least one network device with a honeypot;
   determining, based on the network event proximity, time density, and trend patterns, when a botnet activity is present within the network data; and
   causing execution of an at least one mitigation action when botnet activity is determined to be present.

10. A system for identifying botnets, comprising:
    a processing circuitry; and
    a memory, the memory containing instructions that, when executed by the processing circuitry, configure the system to:
       determine a network event proximity based on collected network data, where the network data relates to at least one network device, and wherein determining the network event proximity includes analyzing the network data of the at least one network device based on transmission control protocol (TCP) fingerprinting;
determine time density of the network data, wherein time density is the amount of network events occurring per time unit;
determine trend patterns of the network data, wherein determining the trend patterns of the network data includes determining interactions of the at least one network device with a honeypot;
determine, based on the network event proximity, time density, and trend patterns, when a botnet activity is present within the network data; and
execute at least one mitigation action when botnet activity is determined to be present.

11. The system of claim 10, wherein the system is further configured to: analyze boot times of the at least one network device.

12. The system of claim 10, wherein the system is further configured to:
identify patterns in server reboot schedules.

13. The system of claim 10, wherein the network event proximity is based on a time proximity and the system is further configured to:
determine the amount of similar network events occurring per time unit.

14. The system of claim 10, wherein the system is further configured to:
identify trends of the at least one network device based on at least one of: sending requests to a single port, requests originating from the same location based on Internet Protocol (IP) address or server routing, the numbers of unique counts of destination ports per IP, the unique counts of source ports per IP, and the total set of destination ports.

15. The system of claim 10, wherein the system is further configured to:
determine a scan rate of the at least one network device.

16. The system of claim 10, wherein the at least one network device is an Internet of Things (IoT) device.

* * * * *